Figure 1:
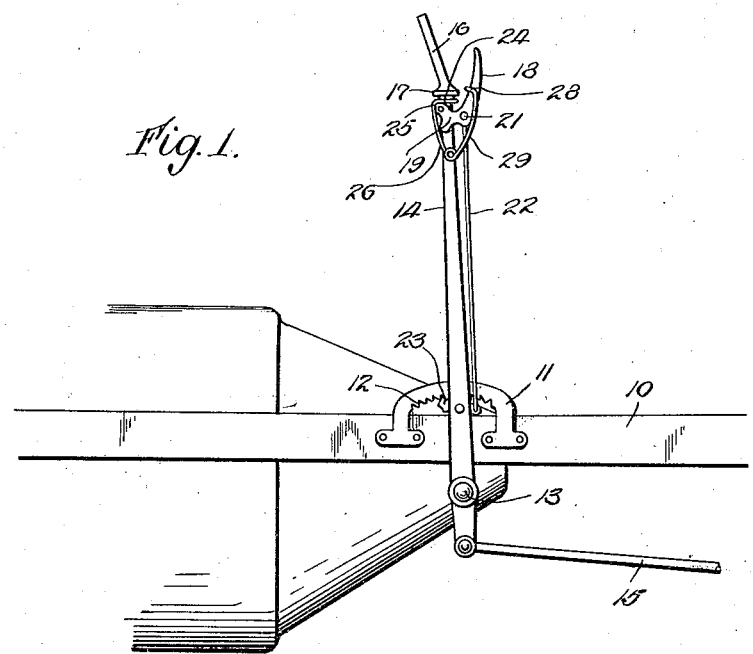

Dec. 11, 1923.

R. J. LOOCK 1,477,138

ANTIRATTLER FOR LEVER CONTROLS

Filed May 10, 1923

Inventor
Robert Jesse Loock

Patented Dec. 11, 1923.

1,477,138

UNITED STATES PATENT OFFICE.

ROBERT JESSE LOOCK, OF BALTIMORE, MARYLAND.

ANTIRATTLER FOR LEVER CONTROLS.

Application filed May 10, 1923. Serial No. 638,139.

*To all whom it may concern:*

Be it known that I, ROBERT J. LOOCK, a citizen of the United States, residing at Baltimore, State of Maryland, have invented certain new and useful Improvements in Antirattlers for Lever Controls, of which the following is a specification.

This invention relates to an anti-rattler for lever controls having a pawl or detent rod. It finds special adaptation in its use with an emergency brake lever for an automobile.

The object of the invention is to provide in connection with a control lever having a pawl or detent rod means for preventing rattling of the parts of the lever, and it comprises a spring element readily applied to the parts without the necessity of disassembling. The emergency brake handles of automobiles are supplied with leaf springs for this purpose; when such leaf spring loses its tension or breaks, it is necessary to remove the handle from the automobile in order to insert a new spring. This is avoided by my invention in the provision of a spring, preferably made of wire stock and capable of being applied within a fraction of a minute without the removal of any parts. Among the objects of the invention is the saving of time and labor in the replacement of anti-rattler springs now in use.

Other objects and advantages of the invention will hereinafter appear in the following description and the novel features thereof will be particularly pointed out in the appended claims.

Proceeding now to a detail description of the invention, reference is had to the drawing, on which like characters represent like parts in both figures, and in which—

Figure 2:
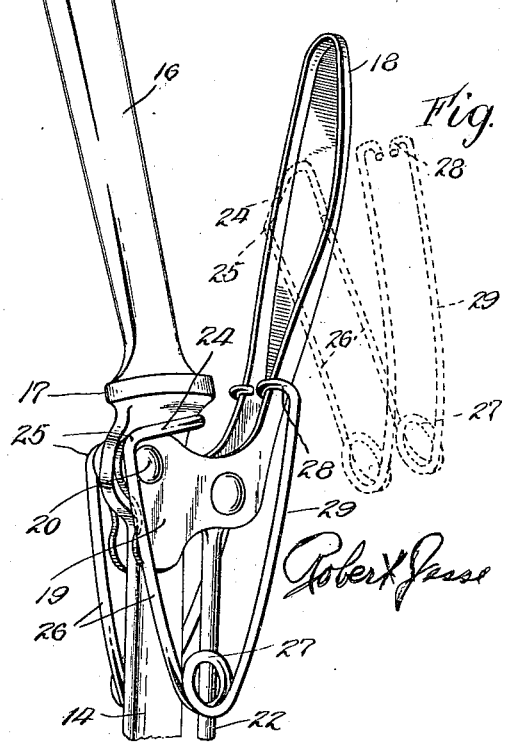

Figure 1 is an elevation of certain parts of an automobile with the anti-rattler applied to the emergency brake lever, and Figure 2 is an enlarged perspective of the upper end of the lever showing the anti-rattler in operative position in full lines, and showing it being applied in dotted lines.

The numeral 10 represents a frame of an automobile chassis on which is mounted the bracket 11 having the teeth 12. Suitably pivoted at 13 to a part of the frame is the control lever 14, from the lower end of which extends the brake operating rod 15. The lever is shown as made of flat stock having at its upper end a rigid hand grip 16, below which is the enlargement or collar 17. There is provided a movable handle 18, comprising cheeks which lie upon opposite sides and are pivoted at 20 to the lever 14. At 21 the cheeks are provided with a pivot pin which serves to connect the handle 18 to the rod 22 controlling the pawl 23 pivoted to the lever in proximity to the bracket 11. It will be appreciated that normally the pawl will be engaged with the teeth of the bracket and that a movement of the handle 18 toward the hand grip 16 will disengage the pawl from the teeth and permit the lever to be shifted to inactive braking position. The construction just described is that which is to be found in the Ford automobile for controlling the emergency brake.

It is necessary and desirable to provide means for holding the pawl in engagement with the teeth and to prevent rattling of the parts of the lever control. I have provided such means in a spring between the handle and the hand grip, which is in normal position out of the way of the operator's hand, and which can be readily and easily applied without disassembling of the parts. This spring is made of a single piece of wire stock bent at its middle to form a lever engaging loop or U 24 to encircle the lever below the collar 17 and above the cheeks 20. The stock is bent at 25 to form the legs 26, at the lower ends of which the coils 27 are provided. The spring terminates in hooks 28 at the ends of legs 29, said hooks engaging over the flanges of the handle 18.

It will be appreciated that the legs 26, coils 27 and legs 29 form spring wings which straddle and lie against the sides of the lever and rod, and that they are under tension tending to spread the hand grip and the handle. The loop 24 lies under the collar 17 of the lever and is held by said collar from upward movement. The portions of the loop and legs adjacent the bends 25 lie against the cheeks of the handle with the heads of the rivets 20 lying in the bends 25 acting as abutments. As will be pointed out, these bends are snapped over the rivet heads in the applying of the spring to the lever, and the spring as a whole is therefore held from movement by the cooperative action of the collar and rivet heads.

In Figure 2 I have shown in dotted lines the position of the spring as it is being applied to the lever. From this position, it is turned through an angle of 90 degrees until the edge of the loop 14 takes under the collar 17, when the spring as a whole is rotated with the bow of the loop as a fulcrum. In this last movement the bends 25 are snapped by the rivet head abutments 20. The hooks 28 are then engaged with the flanges of the handle 18.

While I have described my invention in connection with the emergency brake of an automobile, it will be appreciated that it could be equally well used in connection with a lever control upon any machine in which the lever is associated with a detent or pawl control rod.

Having described my invention, what I claim as new and desire to secure by Letters Patent is:

1. In an anti-rattler for lever controls, the combination of a lever having a hand grip, a pivoted handle associated therewith, and a spring normally spreading said hand grip and handle comprising a loop for engaging the lower portion of one of said members, an engaging portion for the lower portion of the other member, and an intermediate tensioning portion.

2. In an anti-rattler for lever controls, the combination of a lever having a hand grip and a collar and abutments below said hand grip, a pivoted handle associated with said hand grip, and a spring normally spreading said hand grip and handle comprising a loop encircling the handle below said collar and held in place by said collar and abutments, hook terminals for engaging said handle, and connecting tensioning portions between said loop and hook terminals.

3. In an anti-rattler for lever controls, the combination of a lever having a hand grip and a collar at the lower end thereof, a handle comprising cheeks, a pin pivoting said cheeks to said lever below said collar and having heads forming abutments from the cheek faces, and a spring normally spreading said hand grip and handle comprising a loop for encircling the lever below the collar, hook terminals for engaging the handle, and tensioning wings between said loop and hook terminals, portions of said tensioning wings resting upon said handle cheeks and the bends between the wings and loop lying behind said rivet head abutments.

4. An anti-rattler spring made of wire stock and comprising a central loop, terminal hooks and tensioning wings, the loop and hooks being connected to the wings by substantially right angle bends and extended toward each other.

ROBERT JESSE LOOCK.